United States Patent [19]

Hashimoto

[11] Patent Number: 4,742,392
[45] Date of Patent: May 3, 1988

[54] CLAMP CIRCUIT WITH FEED BACK

[75] Inventor: Seiji Hashimoto, Yokohama, Japan

[73] Assignee: Canon Kabushiki Kaisha, Tokyo, Japan

[21] Appl. No.: 65,632

[22] Filed: Jun. 25, 1987

Related U.S. Application Data

[63] Continuation of Ser. No. 635,742, Jul. 30, 1984, abandoned.

[30] Foreign Application Priority Data

Aug. 4, 1983 [JP] Japan .................................. 58-142952
Jan. 7, 1984 [JP] Japan .................................... 59-1221

[51] Int. Cl.⁴ ............................................. H04N 5/18
[52] U.S. Cl. ...................................... 358/172; 358/171
[58] Field of Search ................ 358/166, 171, 172, 34, 358/37

[56] References Cited

U.S. PATENT DOCUMENTS

| 3,308,235 | 3/1967 | Greiner ................................ 358/172 |
| 3,521,177 | 7/1970 | Niet ...................................... 358/172 |
| 4,369,466 | 1/1983 | Matsuzaki ........................... 358/171 |
| 4,415,929 | 11/1983 | Yoshisato ........................... 358/172 |

FOREIGN PATENT DOCUMENTS

| 35573 | 4/1981 | Japan .................................... 358/172 |
| 132671 | 10/1981 | Japan .................................... 358/172 |

Primary Examiner—Tommy P. Chin
Attorney, Agent, or Firm—Fitzpatrick, Cella, Harper & Scinto

[57] ABSTRACT

A clamp circuit comprising: a clamp circuit for clamping an input video signal to a predetermined clamp level in the interval corresponding to a first gate signal; a clamp level forming device for extracting a signal after it is clamped in the interval corresponding to a second gate signal, thereby forming the clamp level; and a signal generating circuit for outputting the first and second gate signals in the black level interval in the signal so that the trailing edge of the first gate signal is time-delayed relative to the trailing edge of the second gate signal. With this clamp circuit, the stable black level can be obtained, so that an image pickup camera in which the clamping characteristic was improved is realized.

21 Claims, 4 Drawing Sheets

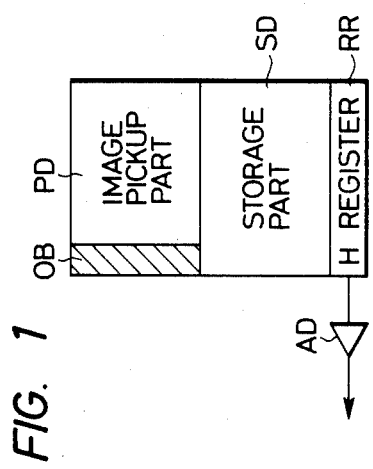

CLAMP CIRCUIT WITH FEED BACK

This application is a continuation of application Ser. No. 635,742 filed July 30, 1984, now abandoned.

FIELD OF THE INVENTION

The present invention relates to a clamp circuit which is suitable to obtain an accurate black level.

BACKGROUND OF THE INVENTION

Conventionally, for example, in a video camera using a solid-state image pickup device, when the signal which was read out is clamped, in many cases, a light-shielded part is provided in an image pickup cell corresponding to the back porch in the horizontal flyback interval to obtain a stable optical black reference signal in each horizontal flyback interval. This is quite obvious in consideration of the points that the dark current which is a factor of variation in black level of the solid-state image pickup device is approximately doubled whenever the temperature of the device is increased by 8° C. and that the ordinary conditions in which the video camera is used lie within a range from −10° C. to +40° C. To accomplish the above-mentioned object, in general, by light-shielding a few to several tens of image pickup cells corresponding to the back porch in the horizontal flyback interval of the solid-state image pickup device, only the dark current component is formed, thereby clamping the signal level in this portion to a reference black level. In order to perform the stable clamping operation in this case, it is desirable that the number of image pickup cells which are allocated to the light-shielded part be large. However, there is a drawback that the use of cells in the light-shielded part causes the resolution to be further reduced in the situation that there are few or no image pickup cells to spare in the horizontal direction.

On the other hand, an increase in number of image pickup cells in a device of a given size implies a large area and high integration for the device, so that this is a difficult problem unless processing technology is remarkably improved.

As a method of solving such a problem, a clamping method of the feedback type is generally known in video cameras using an image pickup tube. Namely, this method is one in which in a system comprising a clamp circuit to clamp a level in the beam blanking interval as a black level to a reference level and a processing circuit to amplify this clamped signal and thereafter to perform the γ correction and the like, an output of the processing circuit is compared with a predetermined reference level in order to make an output of this system stable, and a feedback circuit is provided for the above-mentioned clamp level in order to set the differential output therebetween to be zero.

However, in the case of employing this method for, in particular, the solid-state image pickup device, the noise in the blanking interval can be easily mixed since an output amplifier in such a solid-state image pickup device has a floating structure or the like.

In addition, the reset potential varies due to the temperature characteristic and difference in saturated resistance of a switching transistor in association with the resetting operation to the reference potential when the signal is read out; consequently, the blanking interval cannot be used for the signal which is clamped upon clamping in this state.

On the other hand, in solid-state image pickup devices, clock noise is generally generated (approximately one-third of the saturation signal level) due to the capacity coupling of the signal readout shift pulse in the signal readout interval. Therefore, when the potential at the light-shielded part including this clock noise is detected and is compared with a certain clamping reference level as in the conventional manner, a problem is caused such that the DC component of the video signal cannot be reproduced with a high degree of accuracy.

As a method of solving this problem, a method is known whereby sample and hold means to remove the above-mentioned clock noise is provided at the front stage of the feedback clamp circuit. However, the clock noise of the command pulse of tens of millivolts is generated even in the sample and hold means when considering realization of low voltage and low electric power consumption. On one hand, as the signal level, a level of the order of about $\frac{1}{3}$ to $\frac{1}{2}$ of the saturation signal output level of the solid-state image pickup device is used as the standard operating level. However, since the saturation signal output level of the solid-state image pickup device is ordinarily hundreds of millivolts, the signal level is a value of the order of approximately hundreds of millivolts. Therefore, the ratio of the above-mentioned clock noise to this signal level is about 20 dB, so that it is necessary to set the performance of the feedback clamp circuit to be less than about −30 dB in order to set the black level stability (or low-frequency conversion noise of the clock noise) to be less than about −50 dB, which value is ordinarily required for the image pickup apparatus.

In addition, in the case of using the above-mentioned solid-state image pickup apparatus as the electronic still camera to pick up a still picture image, low electric power consumption and good leading characteristic after power-on are required. In other words, after a release switch (power switch) is turned on, the electric circuits have to be capable of immediately processing the signal from the solid-state image pickup device. For this purpose, it is desirable to directly couple the electric circuits instead of coupling them through capacitors.

However, in the case of directly coupling them, since an output amplifier of the solid-state image pickup device is constituted by an MOS amplifier and there is a variation in threshold voltage of the MOS, the apparatus has to be constituted in a manner such that a sample and hold circuit having a small dynamic range is provided immediately at the post stage of the solid-state image pickup device and thereafter the signal is amplified and is input to a clamp circuit. With such an arrangement, since the clock noise is also amplified, further potential stability is needed in the clamp circuit.

SUMMARY OF THE INVENTION

It is a first object of the present invention to provide a clamp circuit which can solve the above-mentioned drawbacks.

A second object of the invention is to provide a clamp circuit which can obtain the stable black level.

A third object of the invention is to provide an image pickup camera in which the clamp characteristic is improved in consideration of the above-mentioned points.

The above and other objects and features of the present invention will be apparent from the following detailed description in conjunction with the accompanying drawings.

BRIEF DESCRIPTION OF THE DRAWINGS

FIG. 1 is a diagram showing an example of a constitution of a solid-state image pickup device;

FIG. 2 is a block diagram showing a signal processor according to a first embodiment of the present invention;

DETAILED DESCRIPTION OF THE PREFERRED EMBODIMENTS

The present invention will now be described in detail hereinbelow with respect to two embodiments.

Figure 3:
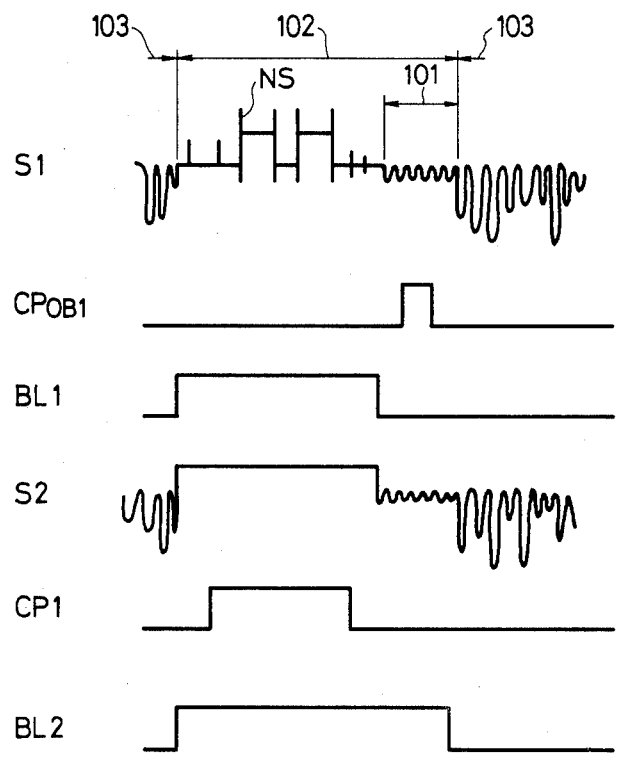
FIG. 3 is a diagram showing waveforms of each part of FIG. 2.
Figure 4:
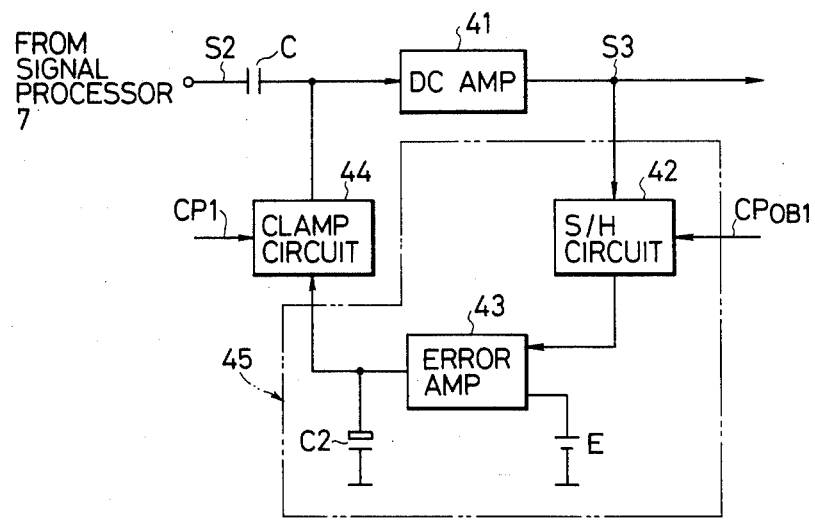
FIG. 4 is a diagram showing an arrangement of a feedback clamp circuit.

FIG. 1 is a diagram showing an example of a constitution of a solid-state image pickup device, FIG. 2 is a diagram showing an example of a block arrangement of a signal processing system, FIG. 3 is a diagram showing waveforms of each part of FIG. 2, and FIG. 4 is a diagram showing an arrangement of a feedback clamp circuit In this embodiment, the optical black part is not subjected to the blanking processing in the blanking processing and black clipping processing after clamping, thereby obtaining a substantially constant signal which is clamped for a long period, namely, in the horizontal blanking interval, allowing the clamping operation to be performed in this interval. At the same time, an optical reference black level signal is detected from the signal corresponding to the optical black part and the clamp level is controlled by use of such detection signal and signal which is clamped.

As is well known, solid-state image pickup devices are mainly classified into the MOS type and CCD type. In this embodiment of the present invention, the case of the frame transfer type CCD will be explained. Such a CCD is shown in FIG. 1. As shown in FIG. 1, the frame transfer type CCD comprises: an image pickup part PD; a storage part SD; a readout register RR; and a preamplifier AD which is on-chipped thereon. The image pickup part PD is provided with an optical black part OB to form a signal which is used as a reference black level signal when the signal is clamped.

Also, in FIG. 2, a reference numeral 1 denotes a solid-state image pickup device (hereinbelow, abbreviated as a CCD); 2 is a driver to drive the CCD 1; 3 is a clock generator as signal generating means for controlling each circuit; 4 a clamp circuit; 5 an amplifier; 6 a first blanking circuit as blanking means; 7 a signal processor; 8 a feedback (F-B) clamp circuit as feedback clamping means; and 9 a second blanking circuit. On the other hand, in FIG. 4, a numeral 41 indicates a DC amplifier; 42 is a sample and hold (S/H) circuit; 43 an error amplifier; and 44 a clamp circuit as clamping means.

The operation of the embodiment with such an arrangement will be described.

In FIG. 2, photoelectrons are generated due to the incident light in the image pickup part PD of the solid-state image pickup device 1 which is driven in response to a driving pulse from the clock generator 3, so that they are stored in one field interval due to the function of the well-known potential wells. The signal charges stored are vertically transferred to the storage part SD in the vertical blanking interval and the charges for the next field are stored in the image pickup part PD in the next field interval. On the other hand, the signal charges of the storage part SD are transferred to the readout register RR for every horizontal line, and the charges are then sequentially read out for every bit and become a PAM (Pulse Amplitude Modulated) signal shown at S1 in FIG. 3. In the PAM signal S1, a reference numeral 101 indicates a reference black level signal part corresponding to the optical black part OB; 102 represents a horizontal blanking signal part; and 103 denotes an effective horizontal scanning signal part. As can be seen from FIG. 3, since a jump-in noise NS and the like from the clock generator 3 appear in the part excluding the reference black level part 101 in the horizontal blanking signal part 102 of the PAM signal S1, the reference black level part 101 is clamped by use of a clamp pulse $CP_{OB1}$ and the DC component is reproduced by clamp circuit 4. This signal is amplified by the amplifier 5 at the next stage and then in the first blanking circuit 6 serving as means for making the signal constant and as pulse mixing means, a blanking pulse BL1 as a level signal according to the present invention is made to act on (i.e., is mixed with) the signal amplified. Thereafter, the signal is respectively subjected to the blanking processing and black clipping processing in the internal blanking processing circuit and black clipping processing circuit, thereby obtaining a signal S2. The above-mentioned blanking pulse BL1 does not have the same width as the entire horizontal blanking interval but has the width of at least a part thereof excluding the reference black level part 101, so that the optical reference black level signal is preserved. Therefore, if the stable signal to be clamped is newly formed in the feedback clamp circuit 8 at the post stage by use of a clamp pulse CP1 as a first gate signal having an a pulse width sufficiently greater than that of the clamp pulse $CP_{OB1}$, a good clamping characteristic can be obtained. In addition, to accurately stabilize the black level, the feedback clamping is performed by use of a black level detecting pulse $CP_{OB1}$ as a second gate signal.

FIG. 4 is a diagram showing an example of an arrangement of this feedback clamp circuit. The signal S2 sent through the signal processor 7 is transmitted through a coupling capacitor C and is clamped to a certain potential by a clamper 44 which is controlled at a timing of the clamp pulse CP1. This signal is connected to the post stage through the DC amplifier 41 and becomes an input signal S3 to the second blanking circuit. The reference black level part 101 corresponding to the optical black part OB in this signal S3 is sampled and held by the sample and hold circuit 42 which is driven at a timing of a sample and hold pulse $CP_{OB1}$. This held signal is compared with a reference voltage E and is amplified by the error amplifier 43, so that a new clamp reference potential including the clamp error component can be derived across a capacitor C2. This signal is fed back to the clamper 44. A numeral 45 denotes a clamp level forming circuit as clamp level forming means.

Due to this, the video signal S2 is clamped so as to cancel the above-mentioned error component. As described above, the feedback type clamp circuit 8 operates so as to always make the potential of the reference black level part 101 of the video signal S2 at the constant potential E. The video signal S3 of which the DC component was reproduced by the clamp circuit 8 is sent to the second blanking circuit 9 at the post stage, in which a blanking pulse BL2 as shown into FIG. 3 is mixed to the signal S3. Thereafter, it is sent to various signal processors.

In this embodiment, the blanking pulse BL1 was mixed in the horizontal blanking interval excluding the reference black level part after the signal had been once clamped by the clamp circuit 4. However, the blanking pulse BL1 may be directly added without providing the clamp circuit 4.

In addition, although an example of the pulse having the width of the interval excluding the reference black level part in the horizontal blanking interval has been shown as the blanking pulse BL1 in this embodiment, a pulse with a slightly narrower width than it may be used.

Also, although the output signal S1 of the CCD 1 is directly clamped in the reference black level part 101 in this embodiment, the clamp potential will become further stable, for example, if a trap circuit, a sample and hold circuit and the like are provided, as a circuit to remove the clock noise of the CCD 1, at the front stage of the clamp circuit 4. On one hand, the feedback clamp circuit may be used as the clamp circuit 4. In such a case, a method is known whereby the horizontal blanking part 102 is clamped by the clamp pulse CP1 and the optical black part 101 is fed back as the black reference signal.

In this case, by providing such a clock noise removing circuit as the present invention to remove the clock noise before the black reference signal is detected, stability of clamp potential will be further improved.

However, it is preferable to obtain final stability of the black potential and good clamping characteristic by the feedback clamp circuit after the signal was processed through the first blanking circuit at the post stage. In the clamp circuit at the first stage, it is better that a constant potential can be formed and the reference black level part can be retained for a certain long time in the horizontal blanking interval.

As described above, by performing the feedback clamping after carrying out the blanking processing which includes no reference black level part, a signal which is clamped with a long period can be obtained. Therefore, by performing the feedback type clamping after that, only a few image pickup cells of the light-shielded part OB are used to detect the clamp error and the stable clamping operation can be also executed. Namely, since almost of the horizontal flyback interval can be utilized as the clamp pulse width, there is an effect of improvement in ham improvement factor, low-frequency transient distortion and horizontal periodic sag which are the three fundamental performances in the clamp circuit.

Figure 5:
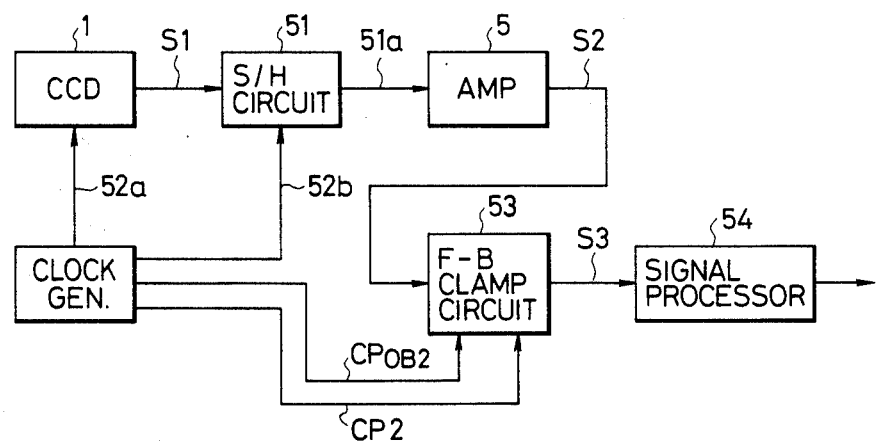
FIG. 5 is a block diagram of a signal processing system according to a second embodiment of the present invention.

Next, FIG. 5 is a diagram showing a second embodiment of the present invention. In this embodiment, to solve the above-mentioned drawbacks in the conventional technology, the signal of the lightshielded part is clamped by use of the clamp pulse as the first gate signal with a wide pulse width, and the potential is detected by the black level detecting circuit by use of the pulse as the second gate signal with a narrower pulse width than the clamp pulse, thereby reducing the influence due to the clock noise.

The second embodiment of the present invention will now be practically described hereinbelow in conjunction with the drawings.

In the diagram, the same parts and components as those shown in FIGS. 1 to 4 are designated by the same reference numerals.

In FIG. 5, a numeral 51 is a sample and hold (S/H) circuit as holding means of the present invention; 52 is a clock signal generator as clock signal generating means; 53 is a feedback clamp circuit; and 54 is a signal processor.

In this embodiment, when the image signal charges stored in the image pickup part PD from the readout register RR shown in FIG. 1 are sequentially and time-serially read out, by supplying the driving pulse to the readout register RR also after the signal of each line of the image pickup part PD was read out, a fictitious reading-out signal is derived.

Although a relatively few dark current components exist in this fictitious reading-out signal, it can be approximately regarded as the same level as the dark current level of the light-shielded part OS.

Figure 6:
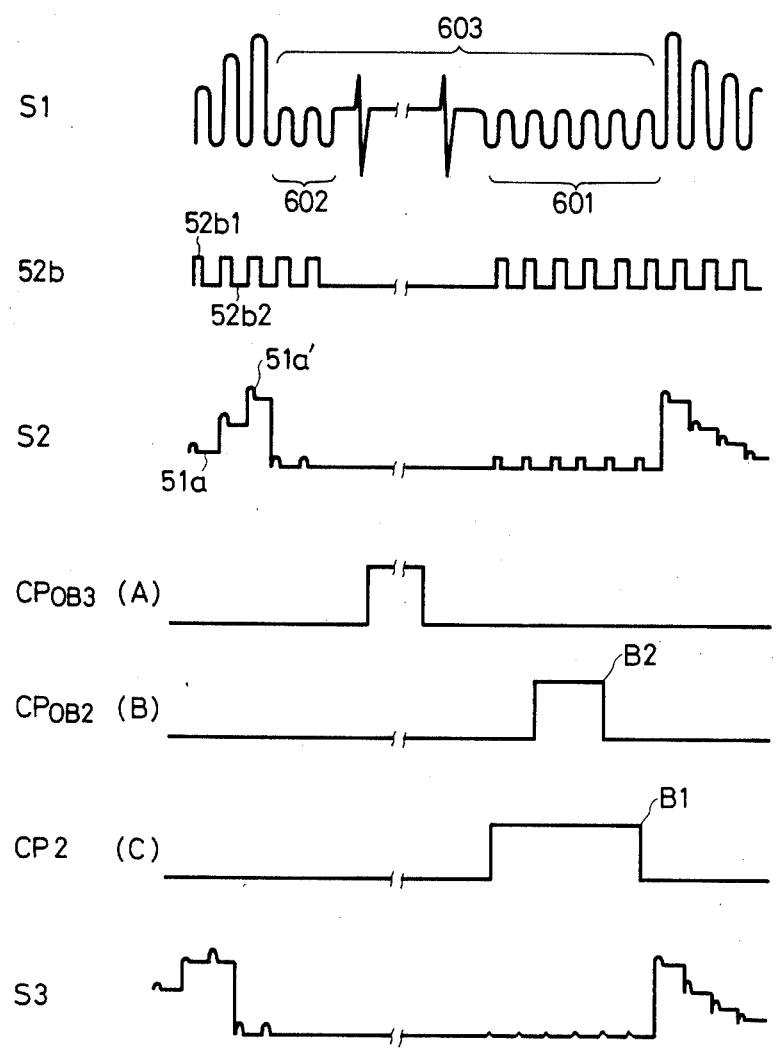
FIG. 6 is a diagram showing waveforms of each part of FIG. 5.

The PAM signal obtained in this way is diagrammatically shown at S1 in FIG. 6.

In the signal S1, a numeral 601 represents a signal corresponding to the light-shielded part OS; 602 indicates a signal corresponding to the fictitious reading-out interval; and 603 is a signal corresponding to the horizontal blanking interval. These signals become the signals indicated at 51a shown in FIG. 6 by the sample and hold circuit 51 at the post stage by a sample and hold pulse 52b ($52b_1$ indicates a sampling pulse and $52b_2$ denotes a holding pulse) shown in FIG. 6. Clock noise 51a' of the sample and hold circuit is added to the signal 51a. The signal 51a is amplified by the amplifier 5 to a proper signal level and the DC component thereof is reproduced by the clamp circuit 53. For example, the clamp circuit 53 is constituted in the manner shown in FIG. 4. The signal S2 sent through the amplifier 5 is transmitted through the coupling capacitor C. Thereafter, it is sent through the clamp circuit 44 of FIG. 6 and is clamped to a certain potential charged in the capacitor C2. In this case, the clamp circuit 44 performs the clamping operation in response to a clamp pulse CP2 as a first gate signal. Although this clamped signal becomes the input signal S3 to the signal processor 54 consisting of an encoder circuit and the like through the DC amplifier 41, the signal portion in the black level interval corresponding to the light-shielded part OS in the signal S3 is sampled and held by the sample and hold circuit 42 which is driven in response to a sample and hold pulse $CP_{OB2}$ as a second gate signal of FIG. 6. Due to this, the optical reference signal is detected and by comparing this detection signal with the reference voltage E and amplifying it by the error amplifier 43, a new clamp reference potential which includes the clamp error component can be obtained. By supplying this signal to the clamp 44, the video signal S2 is clamped so as to cancel the above-mentioned error component.

On the other hand, a clamp pulse $CP_{OB3}$ shown in FIG. 6 (A) is the pulse in case of clamping the potential of which the idle readout signal was held by the sample and hold circuit 51. However, in this case, since the clock noise 51a' is added to the video signal 51a, the clock noise 51a' is also detected when the optical reference signal is detected by the sample and hold circuit 42, so that the stable clamping operation cannot be performed.

Therefore, according to this embodiment of the present invention, the pulse CP2 of the timing as shown in FIG. 6 (C) is used as the clamp pulse as mentioned before. Thus, a feature of this embodiment is that the clock noise of the light-shielded part is removed by clamping the light-shielded part 601 corresponding to the black level interval. When the clock noise of the light-shielded part is removed and the black level is detected by the sample and hold circuit 42 and the feedback clamping is executed, the stable clamping operation can be carried out. If the same pulse of the same phase, e.g., the pulse shown in FIG. 6 (B) is used as the clamp pulse CP2 and sample and hold pulse $CP_{OB2}$, the clamping operation will be unstable as well. This is because a trailing edge B1 of the pulse is most significant in the clamp circuit 44. In other words, in the case where the trailing edge coincides with the phase of the clock noise, the clamping is done at the potential of that clock noise, so that the clock noise will not be removed but still remained even in the portion where the phase of the clock noise and clamp pulse CP2 are not coincident. The remaining clock noise could have been detected due to the $CP_{OB2}$ by the sample and hold circuit 42. In addition, since a trailing edge B2 of the pulse is also important in the sample and hold circuit 42, in the feedback clamp circuit 53, the clamping capacity C and clamp circuit 44 are directly coupled, so that the clamp time constant is small. Therefore, the clamp time constant is enlarged by inserting a resistor therein and a feedback clamp circuit of the soft clamp type may be constituted. This is effective in the case where the clock noise level is particularly large. Also, as the clamp pulse CP2 of the feedback clamp circuit, the pulse of which the sample and hold pulse $CP_{OB2}$ for detection of the black reference level was properly delayed may be used.

As described above, in this embodiment, the signal corresponding to the light-shielded part is clamped to remove the clock noise, and at the same time the optical black reference signal is detected in that interval, so that the stable clamping operation can be performed.

In addition, as compared with the first embodiment, there is no need to provide a blanking circuit to remove the clock noise at the front stage of the feedback clamp circuit. Consequently, a problem of the pulse noise of the noise removing circuit is not caused and the trailing edge of the clamp pulse CP2 may be merely slightly delayed as a time from the trailing edge of the sample and hold pulse $CP_{OB2}$ for detection of the black level. Thus, the constitution of the apparatus becomes very simple.

What is claim is:

1. A clamp circuit comprising:
   clamp means for clamping an input video signal to a predetermined clamp level in an interval corresponding to a first gate signal;
   clamp level forming means for extracting a signal which was clamped by said clamp means in an interval corresponding to a second gate signal to form said predetermined clamp level; and
   signal generating means for outputting said first and second gate signals in a predetermined level interval in the signal.

2. A clamp circuit according to claim 1, wherein said signal generating means is for generating said first and second gate signals such that the trailing edge of said first gate signal is generated after the trailing edge of said second gate signal.

3. A clamp circuit according to claim 1 or 2, wherein said first gate signal has a wider pulse width than a pulse width of said second gate signal.

4. A clamp circuit according to claim 1, wherein said clamp level forming means includes a sample and holding circuit to sample and hold the signal after it was clamped by said clamp means in the interval corresponding to said second gate signal.

5. A clamp circuit according to claim 4, wherein said clamp level forming means includes means for forming a differential signal between an output of said sample and hold circuit and a reference level as said predetermined clamp level.

6. A clamp circuit according to claim 1, wherein said input video signal is further an output of image pickup means for converting an optical image to an electric signal.

7. A clamp circuit according to claim 6, wherein said signal generating means outputs said first and second gate signals in a signal interval corresponding to a light-shielded part formed in a part of said image pickup means.

8. A clamp circuit according to claim 1, wherein said clamp circuit is a feedback clamp circuit.

9. A clamp circuit comprising:
   means for causing a signal at a predetermined level to act on an input video signal during at least a partial interval except for a reference black level interval in a horizontal blanking interval of said input video signal; and
   clamp means for clamping the signal which was caused to be at said predetermined level by said causing means to a clamp level.

10. A clamp circuit according to claim 9, wherein said clamp means clamps said input video signal in said partial interval.

11. A clamp circuit according to claim 9, further comprising clamp level forming means for forming the clamp level of said clamp means.

12. A clamp circuit according to claim 11, wherein said clamp level forming means includes a sample and hold circuit to sample and hold a signal level in said reference black level interval.

13. A clamp circuit according to claim 12, said clamp level forming means includes means for forming a differential signal between an output of said sample and hold circuit and a reference level.

14. A clamp circuit according to claim 9, wherein said input video signal is further an output of image pickup means for converting an optical image to an electric signal.

15. A clamp circuit according to claim 14, wherein said reference black level interval corresponds to a signal from a light-shielded part formed in part of said image pickup means.

16. A clamp circuit according to claim 9, wherein said clamp circuit is a feedback clamp circuit.

17. A clamp circuit according to claim 9, wherein said means for making the signal constant includes mixing means for mixing a predetermined pulse and a clipping circuit to clip an output of said mixing means.

18. A clamp circuit according to claim 9, further comprising second clamp means for clamping said input video signal which is supplied to said making means.

19. A clamp circuit comprising:
   (a) signal generating means for outputting a signal at a predetermined level over a predetermined interval in a horizontal blanking interval;

(b) means for allowing said signal to act on a video signal in said predetermined interval in the horizontal blanking interval;

(c) clamp means for clamping the video signal in at least a part of said predetermined interval on the basis of said signal; and (d) means for controlling a clamp level of said clamp means in accordance with a level of the signal in a reference black level interval in the video signal which was clamped by said clamp means.

20. A clamp circuit according to claim 19, wherein said control means includes a sample and hold circuit to sample and hold said level of the signal in said reference black level interval.

21. A clamp circuit according to claim 19, wherein the video signal clamped by said clamp circuit is a signal outputted by an image pick up means and said reference black level interval corresponds to a signal from a light-shielded part formed in a part of the image pick up means.

* * * * *

UNITED STATES PATENT AND TRADEMARK OFFICE
CERTIFICATE OF CORRECTION

PATENT NO. : 4,742,392

DATED : May 3, 1988

INVENTOR(S) : SEIJI HASHIMOTO

It is certified that error appears in the above-identified patent and that said Letters Patent is hereby corrected as shown below:

AT [54] IN THE TITLE

"FEED BACK" should read --FEEDBACK--.

COLUMN 1

Line 2, "FEED BACK" should read --FEEDBACK--.
Line 47, "which" should read --which,--.

COLUMN 2

Line 27, "performahce" should read --performance--.

COLUMN 4

Line 41, "an" should be deleted.
Line 42, "CPOB1," should read --$CP_{OB1}$,--.

COLUMN 5

Line 7, "mixed to" should read --mixed into--.
Line 53, "almost" should read --most--.
Line 62, "lightshielded" should read --light-shielded--.

COLUMN 7

Line 20, "remained" should read --remains--.
Line 52, "is claim" should read --I claim--.

UNITED STATES PATENT AND TRADEMARK OFFICE
CERTIFICATE OF CORRECTION

PATENT NO. : 4,742,392

DATED : May 3, 1988

INVENTOR(S) : SEIJI HASHIMOTO

It is certified that error appears in the above-identified patent and that said Letters Patent is hereby corrected as shown below:

COLUMN 8

Line 64, "making" should read --causing--.

Signed and Sealed this

Twenty-fifth Day of October, 1988

Attest:

DONALD J. QUIGG

*Attesting Officer*   *Commissioner of Patents and Trademarks*